United States Patent

Serrell

[15] 3,659,467
[45] May 2, 1972

[54] ORBITING ROLLER MECHANICAL VIBRATION GENERATOR

[72] Inventor: Peter V. H. Serrell, Solana Beach, Calif. 92075

[73] Assignee: Shell Oil Company, New York, New York

[22] Filed: Oct. 29, 1969

[21] Appl. No.: 872,127

[52] U.S. Cl. ................................74/87, 74/61, 259/DIG. 42
[51] Int. Cl. .........................................................F01b 31/00
[58] Field of Search ..........................74/61, 87; 198/220 D; 209/367.5, 366; 308/21, 9; 259/DIG. 42

[56] References Cited

UNITED STATES PATENTS

| | | | |
|---|---|---|---|
| 2,947,183 | 8/1960 | Carrier, Jr. et al. | 74/61 |
| 3,472,565 | 10/1969 | Arneson | 308/9 |
| 3,512,850 | 5/1970 | Youden | 308/9 |
| 3,189,106 | 6/1965 | Bodine | 74/61 |
| 3,486,387 | 12/1969 | Bray, Jr. | 74/61 |
| 3,499,692 | 4/1970 | Kaiser | 308/9 |
| 3,358,815 | 12/1967 | Musschoot | 74/61 |
| 2,884,790 | 5/1959 | Lehman | 74/61 |

*Primary Examiner*—Edgar W. Geoghegan
*Assistant Examiner*—Ronald H. Lazarus
*Attorney*—Freling E. Baker and J. H. McCarthy

[57] ABSTRACT

The roller of an orbiting roller vibration generator is radially retained within an internal raceway formed in the oscillator body member, and driven in rolling engagement with the raceway by a crank having four hydrodynamic bearings: two trunnion bearings concentric with the raceway and two crank-pin bearings concentric with the roller; the clearances in said bearings providing the radial compliance necessary to accommodate the radial motions, due to deflections and manufacturing imperfections of the roller relative to the trunnion bearing centerline, without transferring a significant part of the roller radial load from the race to the crank bearings.

3 Claims, 4 Drawing Figures

INVENTOR:
PETER V. H. SERRELL
BY: *Felling E Baker*
HIS ATTORNEY

PATENTED MAY 2 1972

INVENTOR:
PETER V. H. SERRELL
BY: Frederick E. Baker
HIS ATTORNEY 3,659,467

1

ORBITING ROLLER MECHANICAL VIBRATION GENERATOR

BACKGROUND OF THE INVENTION

The present invention is directed to mechanical vibration generators and pertains more particularly to an orbiting roller-type oscillator.

Many industrial uses of high power or high levels of sonic energy have recently been found. These include sonic pile driving, drilling, earth moving, treatment of liquids and other materials. Resonance systems are generally employed for delivering the vibrations or energy from an oscillator to a work member. The workload is generally characterized as having a high impedance and a low velocity amplitude. These systems generally develop high forces at relatively high frequencies.

One major problem with such systems is the lack of effective oscillators or vibration generators capable of developing the necessary high forces and accelerations. The most promising oscillator developed for these applications is the orbiting roller type of oscillator wherein a cylindrical roller orbits within an internal raceway. The radially directed centrifugal forces developed by the eccentric roller are transmitted through the raceway into the body member of the oscillator which is coupled to what is generally referred to as a resonator. A typical resonator member is an elastic rectangular bar constructed of material such as a good grade of steel in which either lateral or longitudinally directed standing wave vibrations are developed by means of the oscillator and transmitted from the bar to a work member.

One of the major problems with the orbiting roller type of generator is the axial containment of the roller. This problem is caused in part by the fact that it is almost impossible to machine a perfect cylinder for the roller or its raceway. Thus, at the time that the force between the roller and the raceway produces limiting contact stresses, the slight taper of roller and raceway cause the roller to crowd to one end of the oscillator and engage the axial restraint with a force equal to the radial roller force times the coefficient of friction between roller and raceway. Experience has also shown that if the roller is driven by a single bearing at its center with negligible directional guidance, it tends to become directionally unstable and oscillates between end guides, producing destructive wear of these parts.

SUMMARY OF THE INVENTION

It is a primary object of the present invention to provide a reliable high output force oscillator in which means are provided to separate the torque-dependent forces on the crankshaft necessary to drive the oscillator rotationally from the centrifugal forces generated between the roller and its race, the latter being many times the former, and to provide full-film lubrication of this separation means.

It is a further object of the present invention to provide a combination of roller directional guidance and hydrodynamically lubricated axial constraint which allow negligible wear of the axial constraint means.

The primary object of the present invention is carried out by providing an orbiting roller oscillator wherein the roller centrifugal forces are carried by the raceway, and the roller is rotationally driven by a crankshaft operating in hydrodynamic bearings. The crankshaft is balanced about the axis of its trunnion bearings, thus providing minimum bearing loads from its own unbalance. The hydrodynamic bearings are designed to operate at maximum eccentricity with maximum clearance. To increase effective clearance and reduce surface speed, bearings of the floating bushing type are used. Since the available clearance within the bearings is several times the deviation from circular of the path of the roller centerline within the race, the main load developed within the roller crankpin bearings $F_t$ of FIG. 4 is tangential to the path of the roller centerline and within the trunnion bearings $F_r$ of FIG. 4 is equal in magnitude, parallel, and opposite in sense. Equal, opposite, and colinear radial components $F_e$ of FIG. 4 will develop within the crankpin and trunnion bearings due to the deviation from circular and concentric of the path of the roller axis, but the magnitude of these radial force components will be generally less than the tangential components the doubly directed arrow indicates these error forces can act either inwardly or outwardly. Due to the continual relative motion of the bearing surfaces, the necessary radial compliance is hydrodynamically lubricated, and galling and fretting of the load separating means is eliminated.

The further object of correct roller guidance and containment is carried out by spacing the crankpin bearings as far apart as possible within the roller, and providing conical rings concentric with the race contacting conical surfaces of the same cone angle on the ends of the roller. The widely spaced crankpin bearings in conjunction with the trunnion bearings provide directional guidance of the roller and damping of any tendency toward directional oscillation. Thus guided, the roller merely drifts to one end of the oscillator where it is restrained by one of the conical guide rings. Since the guide ring and the end of the roller are of the same cone angle, but different diameters, the curvature of the roller end is greater than that of the guide ring where they engage. This curvature difference combined with the relative motion of the roller end and the guide ring produce hydrodynamic separation of the parts and containment of the roller with minimum wear and friction.

BRIEF DESCRIPTION OF THE DRAWINGS

The above and other objects and advantages of the present invention will become apparent to those skilled in the art from the following specification when read in conjunction with the drawings in which.

DESCRIPTION OF PREFERRED EMBODIMENTS

Figure 1:
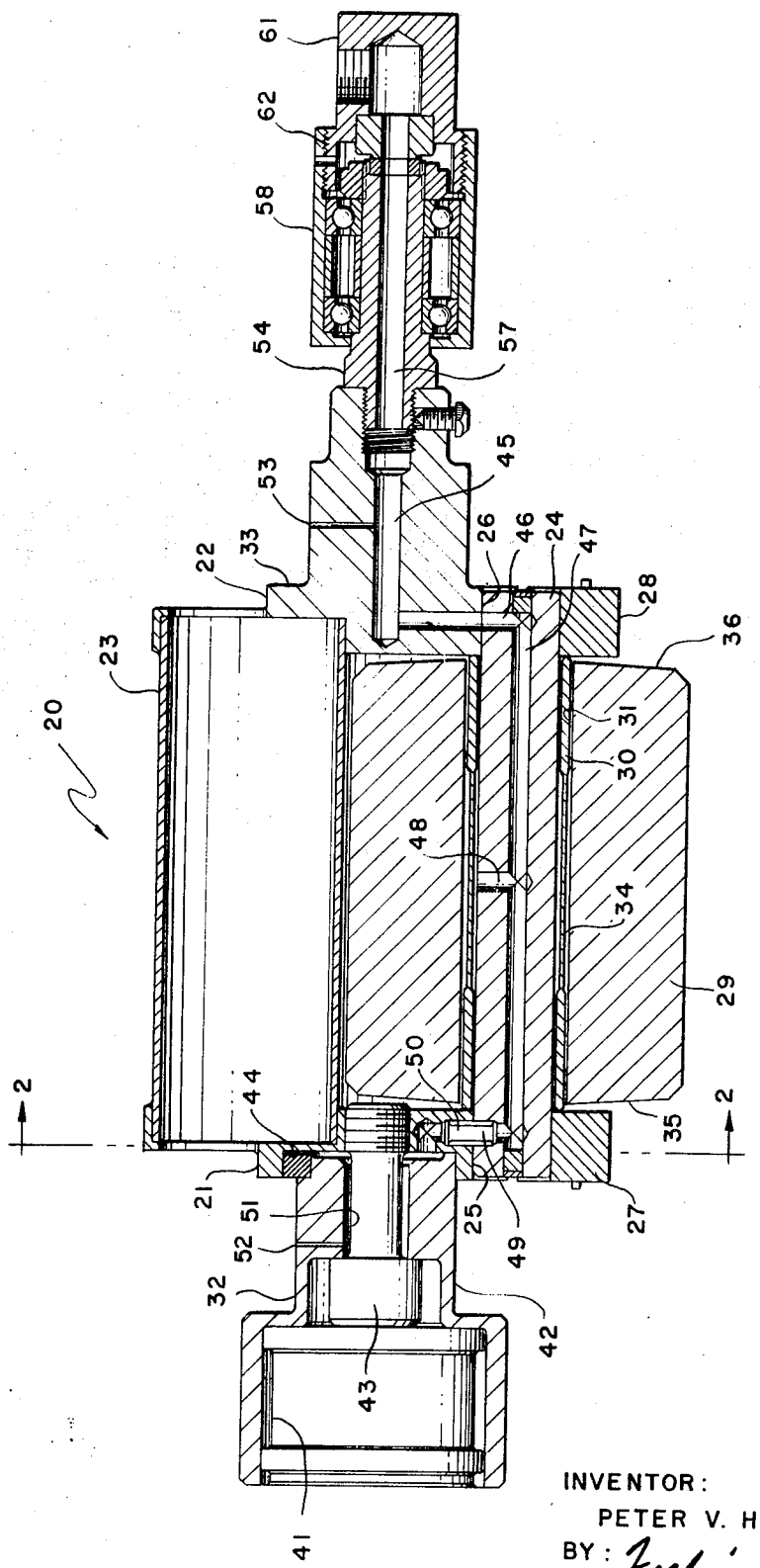
FIG. 1 is a side elevation in section of a preferred embodiment of the crank and roller of the present invention.
Figure 2:
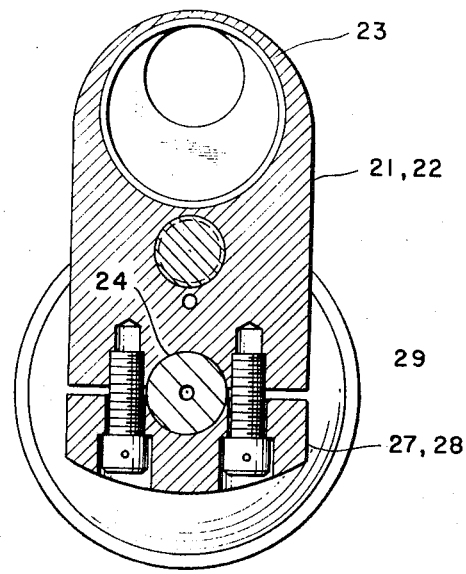
FIG. 2 is an end view section taken substantially along lines 2—2 of the embodiment of FIG. 1.
Figure 3:
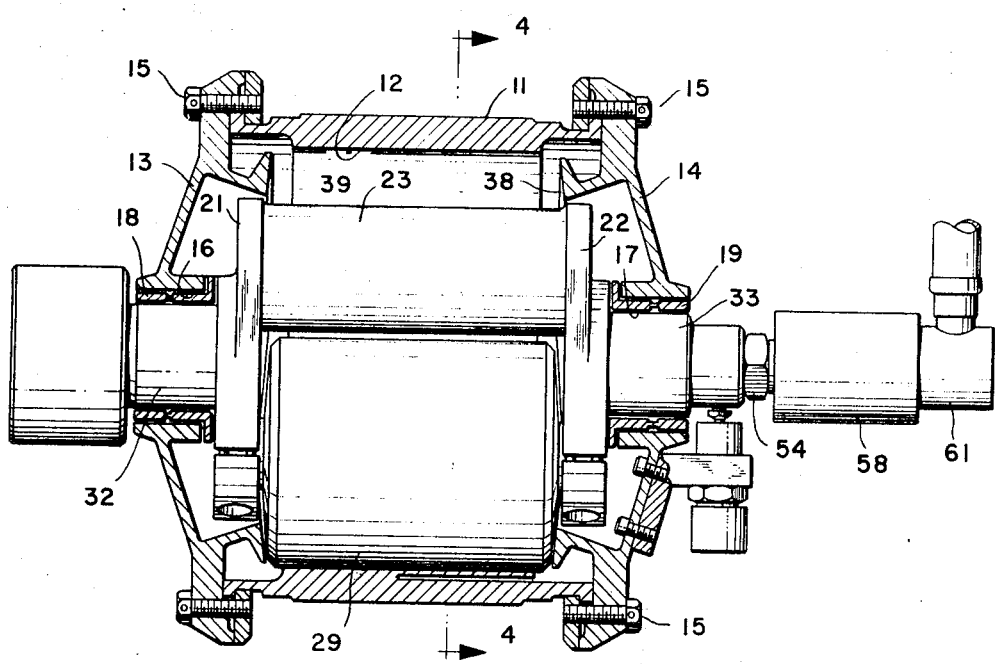
FIG. 3 is a side elevation partially in section showing a housing and raceway supporting the apparatus of FIG. 1.
Figure 4:
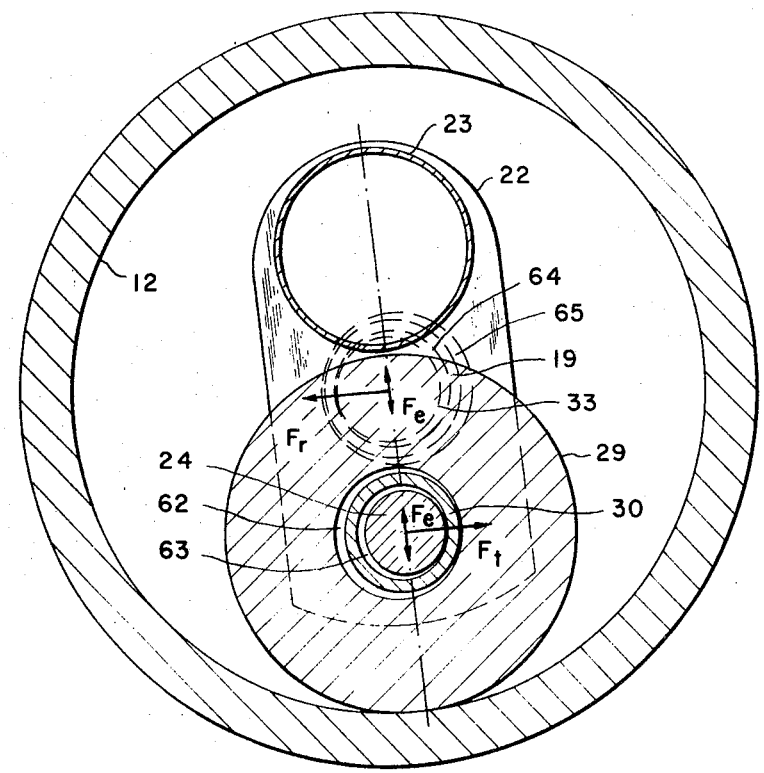
FIG. 4 is an end view section taken substantially along lines 4—4 of FIG. 3, with bearing clearances greatly exaggerated.

Referring now to the drawings and more particularly to FIGS. 1 and 2, there is shown a housing member designated by numeral 11 having a central substantially cylindrical raceway 12 formed therein. A pair of end bells 13 and 14 structurally close off the ends of the housing, but are perforated for the escape of spent lubricant, and are held in place such as by cap screws 15. A bore 16 is formed in bell 13 and a like bore 17 is formed in bell 14 for supporting or receiving suitable flanged floating bushing journal bearing means 18 and 19 in which is journaled a closed loop crankshaft 20. The crank shaft 20 comprises a pair of crank throws 21 and 22 carrying journals 32 and 33 and suitably connected together by means of a bridge or saddle member 23 and a crank pin or journal 24 forming a closed loop. Alternatively, the crankshaft may be open loop, in which case the crankpin must be enlarged to carry the bending and torsion loads, and a structurally adequate joint must be provided in the crank pin for assembly of the crank with the roller. Each crank throw 22 and 23 has semi-cylindrical ways or slots 25 and 26 formed therein for receiving crankpin 24. A pair of retainer block members 27 and 28 retain the crankpin 24 in the ways 25 and 26. An inertial roller 29 is journaled by means of a floating bushing hydrodynamic bearing on crankpin or journal member 24. The hydrodynamic bearing comprises an annular passageway formed between the outer surface of journal 24 and the surface of bore 31 in member 29 and bushing 30 positioned in said passageway. Clearances 62 and 63 are provided between the journal and the bushing and between the bushing and the roller bore, and additional clearances 64 and 65 are provided between the crankshaft journals and the flanged floating bushings and between the flanged floating bushings and the end bell bore. These clearances are made as large as the hydrodynamics of the bearings will allow without generating unduly thin lubricating films. The sleeve 30 is preferably constructed to have a thin center section and somewhat thicker end sections. This configuration of member 30 spreads the load-carrying portions of the bearing as far apart as possible and in conjunction with the main bearings, gives maximum directional guidance and damping to the roller. This arrangement prevents the roller 29 from developing directional oscillations, and prevents it from driving alternately into the end guide rings 38 and 39 with destructive force.

The remaining necessary roller guide means is provided by substantially conical surfaces 35 and 36 on roller 29 which mate or engage complimentary conical bearing surfaces 38 and 39 on end bells 13 and 14. These can be determined for a free fit when the roller 29 is in its outermost position. Adequate lubricant is supplied from the flow of fluid from the bearing clearance 62 and 63 and the curvature difference of the engaging surfaces promotes hydrodynamic separation.

A suitable prime mover may be coupled to the shaft by any suitable means such as a splined coupling 41 formed in stub shaft 42 which may be either formed integral with member 21 or coupled as shown by means of a bolt 43 and key 44, or face spline.

Lubricating fluid may be supplied to all the various bearings through a system of channels or conduits formed in the crank. A suitable channel 45 extends along the axis of journal member 33 and radially outward through crank throw 22 and communicates by means of radial port 46 formed in crankpin 24. A channel 47 extends along the central axis of the crankpin 24 to communicate with port 48 to supply fluid to the annular passageway 34. A further port communicating with channel 47 communicates with channel 50 in crank throw 21 and supplies fluid to an annular channel 51 which in turn supplies fluid via channel 52 to journal 32. Fluid may be supplied to journal 33 by means of a channel 53 formed therein and communicating with channel 45. A suitable fixture for supplying fluid to channel 45 comprises a rotary fluid joint to supply lubricant from the source to the end of the crankshaft.

Thus it can be seen that there is disclosed an orbiting rotor oscillator comprising a cylindrical roller radially restrained by means of raceway and driven tangentially by hydrodynamic bearings on a crankshaft said roller being adapted to move outward into engagement with a cylindrical raceway, without significantly radially loading the hydrodynamic gearings and conical-shaped end bearing means carried by a housing and engageable with the ends of said roller, directional guidance provided by two pairs of bearings: one pair in the housing, and one pair in the roller.

I claim as my invention:

1. An orbiting roller oscillator, said oscillator comprising:
   means forming a relatively fixed housing;
   said housing means including a cylindrical raceway;
   a closed loop crankshaft journaled for rotation in said housing co-axial with said cylindrical raceway;
   said crankshaft including a pair of axially aligned hydrodynamically lubricated journals;
   an elongated crank pin carried by said crankshaft in an offset relationship to said journals, the crank pin extending axially for substantially the length of the raceway;
   cylindrical roller means mounted for rotation movement about said crankpin and radially restrained by and directly engaging said cylindrical raceway;
   said cylindrical roller means tangentially driven by hydrodynamic bearings means on said crankpin extending along the entire length of the crankpin through the roller means;
   said hydrodynamic journal and crankpin bearings permitting said cylindrical roller to move radially into engagement with said cylindrical raceway without imposing significant radial load on said crankshaft, oscillating movement within the bearing clearances due to radial variations in the raceway being hydrodynamically lubricated by the preponderantly rotational movement within the bearings;
   a source of lubricating fluid;
   conducting means extending along said crank means for directing said fluid to said bearings; and,
   end bearing means carried by said housing; said end bearing means engaging the ends of said cylindrical roller means.

2. The oscillator of claim 1 wherein said end bearing means are conical in shape over substantially the entire radial length thereof and engaging ends of said cylindrical roller means have a complimentary shape favorable to the development of hydrodynamic lubrication.

3. The oscillator of claim 1 wherein said hydrodynamic bearing means includes a cylindrical floating bushing fitting within an annular space between a cylindrical bore in said roller means and said crankpin extending therethrough, the cylindrical floating bushing extending substantially the length of the roller means; and includes flanged floating bushings fitted within the annular space between said housing and the said axially aligned journals;
   means directing lubricant to said floating bushing bearings, said bearings as widely axially spaced as possible to give directional guidance and damping to said roller means.

* * * * *